(12) United States Patent
Maor et al.

(10) Patent No.: US 10,990,399 B2
(45) Date of Patent: Apr. 27, 2021

(54) METHODS AND APPARATUS TO IMPLEMENT EFFICIENT COMMUNICATIONS BETWEEN COMPONENTS OF COMPUTING SYSTEMS

(71) Applicant: Intel Corporation, Santa Clara, CA (US)

(72) Inventors: Moshe Maor, Kiryat Mozking (IL); Yaniv Fais, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/539,005

(22) Filed: Aug. 13, 2019

(65) Prior Publication Data

US 2019/0361702 A1 Nov. 28, 2019

(51) Int. Cl.
*G06F 9/30* (2018.01)
*G06F 9/54* (2006.01)
*G06F 9/38* (2018.01)

(52) U.S. Cl.
CPC ...... *G06F 9/30185* (2013.01); *G06F 9/30134* (2013.01); *G06F 9/54* (2013.01)

(58) Field of Classification Search
CPC .................................. G06F 9/30; G06F 9/312
See application file for complete search history.

(56) References Cited

U.S. PATENT DOCUMENTS

| | | | | |
|---|---|---|---|---|
| 6,757,809 B1* | 6/2004 | Yoshida | .............. | G06F 9/30036 710/307 |
| 2003/0236651 A1* | 12/2003 | Miyasaka | .............. | G06F 7/4876 703/2 |
| 2012/0324408 A1* | 12/2012 | Shacham | ................ | G06F 30/30 716/102 |
| 2013/0145127 A1* | 6/2013 | Hardage | ............. | G06F 9/30112 712/214 |
| 2016/0210154 A1* | 7/2016 | Lin | ..................... | G06F 12/0875 |
| 2017/0123492 A1* | 5/2017 | Marggraff | .............. | H04N 5/247 |

* cited by examiner

*Primary Examiner* — Getente A Yimer
(74) *Attorney, Agent, or Firm* — Hanley, Flight & Zimmerman, LLC

(57) ABSTRACT

Methods and apparatus to implement efficient communications between components of computing systems are disclosed. An example apparatus includes a message generator to: add a first value associated with a first field of a message to a shift register based on a first push operation, the message including multiple fields, at least two of the fields having different bit widths; and add a second value associated with a second field of the message to the shift register based on a second push operation, the second value to be adjacent the first value in the shift register in accordance with a structure of the message. The example apparatus further includes a communications interface to transmit content stored in the shift register to a hardware device via a bus having a width corresponding to a width of the shift register, the content including the message.

24 Claims, 6 Drawing Sheets

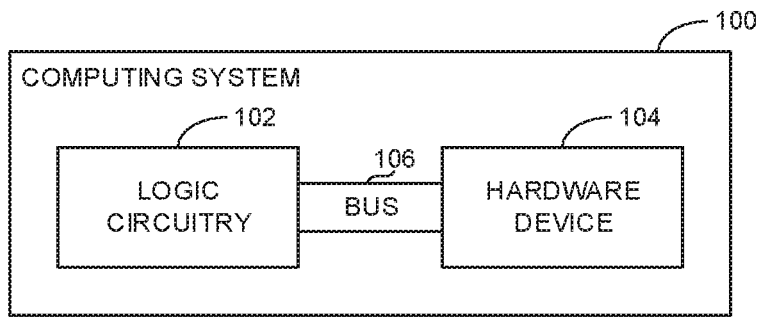

FIG. 1

| | Field | Width (bits) |
|---|---|---|
| LSB | opcode | 4 |
| | reset | 1 |
| | fence | 1 |
| | rw_en | 1 |
| | Xflush | 1 |
| | Wflush | 1 |
| | non_posted | 1 |
| | read_neg_write | 1 |
| | rw_address | 8 |
| MSB | rw_data | 32 |
| | Total Width | 51 |

FIG. 2

| | Field | Width (bits) |
|---|---|---|
| LSB | opcode | 4 |
| | I_data_type | 2 |
| | I_data_type_sign | 1 |
| | W_data_type | 2 |
| | BypassConv_e | 1 |
| | W_BID_base | 16 |
| | W_BID_size | 16 |
| | Wx_kernel_size | 4 |
| | Wy_kernel_size | 4 |
| | W_tile_width | 16 |
| | INTERMEDIATE_pitchZ | 8 |
| | OFM_tile_width | 8 |
| | OFM_pitchZ | 8 |
| | IFM_BID_base | 16 |
| | IFM_BID_size | 16 |
| | IFM_tile_width | 8 |
| | IFM_conv_strideX | 4 |
| | IFM_conv_strideY | 4 |
| | IFM_pitchZ | 8 |
| | padding_mode | 2 |
| | padding_value | 8 |
| | BIAS_BID_base | 16 |
| MSB | bias_cfg | 1 |
| | Total Width | 173 |

METHODS AND APPARATUS TO IMPLEMENT EFFICIENT COMMUNICATIONS BETWEEN COMPONENTS OF COMPUTING SYSTEMS

FIELD OF THE DISCLOSURE

This disclosure relates generally to computing systems, and, more particularly, to methods and apparatus to implement efficient communications between components of computing systems.

BACKGROUND

Logic circuitry, such as processors (e.g., microprocessors), controllers, and/or other programmable computing devices (e.g., FPGAs, ASICs, etc.) often generate messages that are communicated in a computing system to control the operation of other hardware devices. As technology has advanced, the messages provided by a processor, a controller, and/or other programmable computing devices have become increasingly complex. At the same time, it is increasingly more important to generate and deliver such messages in faster time frames.

BRIEF DESCRIPTION OF THE DRAWINGS

FIG. 1 is a block diagram of an example computing system constructed in accordance with teachings disclosed herein.

FIG. 2 is a table illustrating an example structure for an example control message generated by the example logic circuitry of FIG. 1.

FIG. 3 is a table illustrating an example structure for an example execute message generated by the example logic circuitry of FIG. 1.

In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Figure 8:
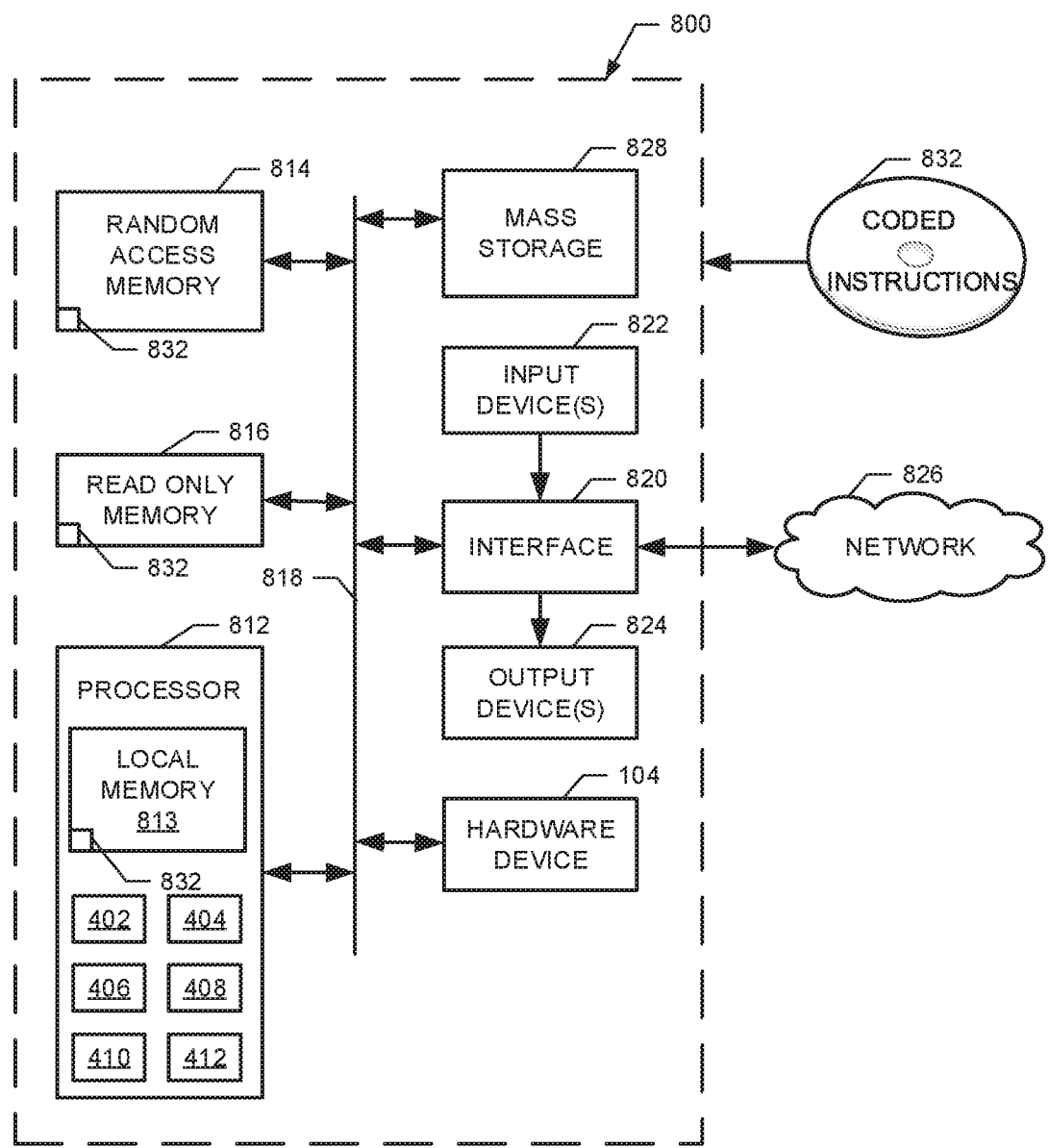
FIG. 8 is a block diagram of an example processing platform structured to execute the instructions of FIG. 7 to implement the example logic circuitry of FIGS. 1 and/or 4.
Figure 9:
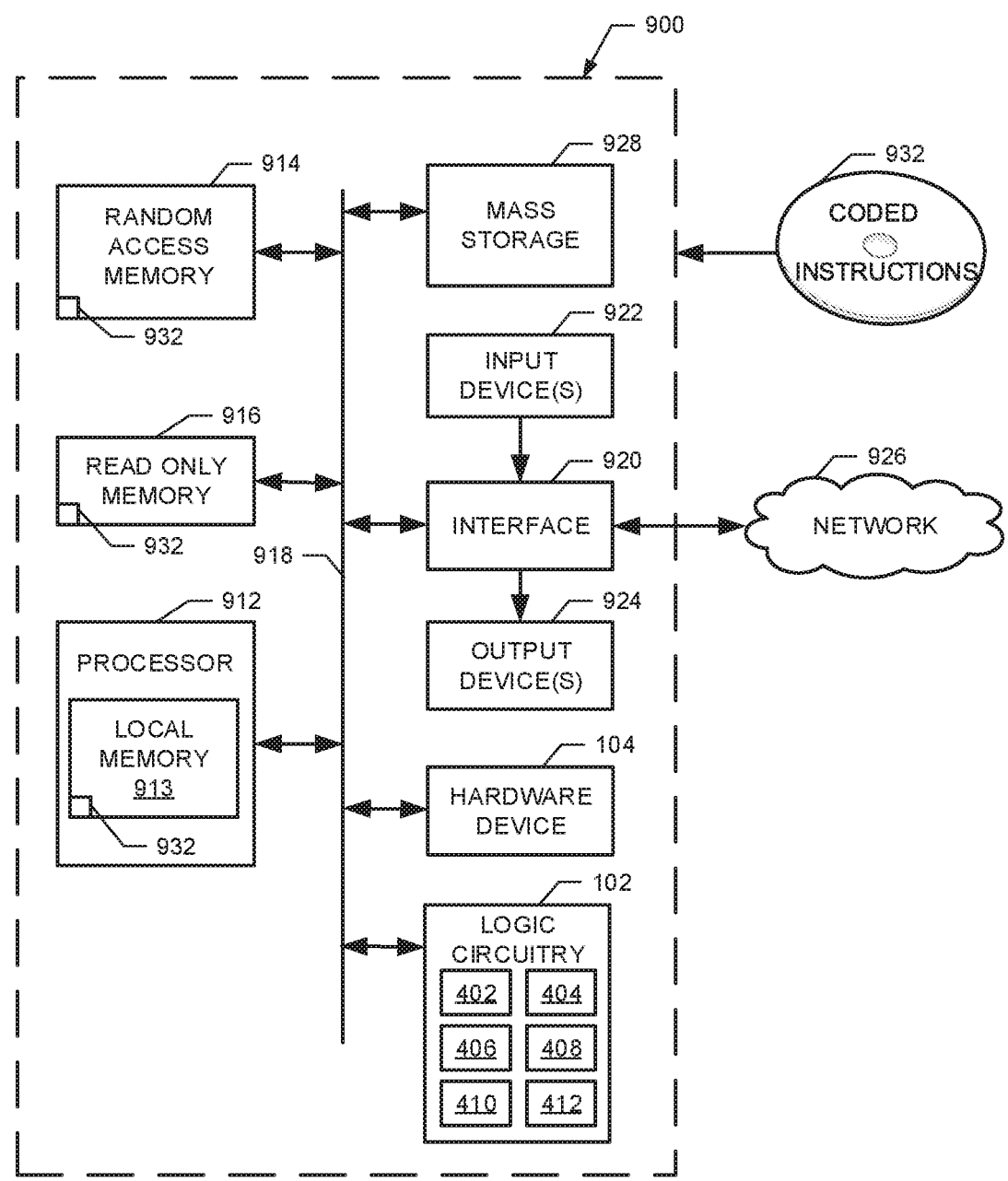
FIG. 9 is a block diagram of another example processing platform structured to execute the instructions of FIG. 7 to implement the example logic circuitry of FIGS. 1 and/or 4.

FIG. 1 is a block diagram of an example computing system 100 constructed in accordance with teachings disclosed herein. The example system 100 could be implemented in different forms including, for example, as an integrated circuit (IC) (e.g., a system on a chip (SoC) containing a microprocessor, a digital signal processor (DSP), and hardware accelerators), on a circuit board (e.g., to be plugged into a larger device/system, such as a switch), and/or as part of a processor platform. The example system 100 of FIG. 1 is representative of an example IC/SoC structured to implement the teachings disclosed herein. FIG. 8 is representative of an example processor platform structured to implement the teachings disclosed herein. FIG. 9 is representative of another example processor platform containing a circuit board or IC/SoC structured to implement teachings disclosed herein. AS shown in FIG. 1, the example system 100 includes logic circuitry 102 communicatively coupled with a hardware device 104 via a bus 106. More particularly, the example logic circuitry 102 controls the example hardware device 104 by generating and sending data, commands, and/or instructions (collectively referred to herein as messages) over the example bus 106. The example logic circuitry 102 may be any suitable programmable controller such as, a processor, a co-processor, a field programmable gate array (FPGA), an application-specific integrated circuit (ASIC), a digital signal processor (DSP), and/or a controller. The example hardware device 104 may be any suitable hardware capable of being controlled by messages sent from the example logic circuitry 102. As a specific example, for purposes of explanation, the logic circuitry 102 may be a digital signal processor (DSP) and the hardware device 104 may be a hardware accelerator used to perform deep learning convolution operations. In other examples, the hardware device 104 may be a different type of hardware accelerator and/or other type of device (e.g., a correlator, a matrix operator, a FFT calculator, etc.).

In some examples, the bus 106 is relatively wide. For purposes of explanation, the bus is described as being 96 bits wide. However, in other examples, the bus 106 may include more or less than 96 bits. The relatively wide bus 106 enables the controller to send correspondingly wide messages (e.g., up to ninety-six bits wide when the bus 106 is ninety-six bits wide) to the hardware device 104 at a single point in time (e.g., with the bits of the messages sent in parallel across the bits of the bus 106). More particularly, as explained further below, the example logic circuitry 102 is capable of efficiently defining complex messages containing any suitable number of fields of any suitable size (e.g., bit width). In some examples, the field sizes (e.g., field widths) are limited to correspond to bit widths of powers of two (e.g., 1 bit fields, 2 bit fields, 4 bit fields, 8 bit fields, 16, bit fields, 32 bit fields, etc.). In some examples, fields of different bit widths (e.g., other than a power of two) may also be implemented. The basic structure for two example messages are shown in FIGS. 2 and 3.

FIG. 2 is a table illustrating an example structure of an example control message 200 that may be generated by the example logic circuitry 102 of FIG. 1. FIG. 3 is a table illustrating an example structure of an example execute message 300 that may be generated by the example logic circuitry 102 of FIG. 1. The messages 200, 300 may be sent to the hardware device 104 for execution. As mentioned above, the labels for the separate fields in the example messages 200, 300 of FIGS. 2 and 3 are specific to a DSP controlling a hardware accelerator for deep learning convolution processing. However, any other type(s) of message containing any other type(s) of fields may additionally or alternatively be generated by the logic circuitry 102. As shown by a comparison of the illustrated examples in FIGS. 2 and 3, different messages generated by the logic circuitry 102 may have different numbers of fields that are of different sizes resulting in messages of different lengths (e.g., total bit width). Further, the fields in the different messages may be arranged in any suitable order. For instance, the example control message 200 of FIG. 2 has ten different fields including seven 1-bit fields, one 4-bit field, one 8-bit field, and one 32-bit field, for a total message width of 51 bits. By contrast, the example execute message 300 of FIG. 3 has twenty-three different fields including three 1-bit fields, three 2-bit fields, five 4-bit fields, six 8-bit fields, and six 16-bit fields, for a total message width of 173 bits. In examples where the size of a message exceeds the bit width of the bus 106 (e.g., a message larger than the 96 bits of the bus in the current example, such as the execute message 300), the message may be separated into two or more separate sub-messages so that the total width of each sub-message is no more than the width of the bus (e.g., no more than 96 bits). How the fields are separated into two different sub-messages and ordered in each sub-message is irrelevant to the implementation of examples disclosed herein. Thus, in accordance with teachings disclosed herein, the structure (e.g., size and order of fields) of the messages 200, 300 of FIGS. 2 and 3 and/or any other messages and/or sub-message the logic circuitry 102 is to generate may differ from one another. For the sake of brevity, full messages and partial sub-messages are collectively referred to herein simply as messages.

While the structure, length, and/or complexity of messages generated in accordance with teachings disclosed herein may differ from one another, in some examples, each different type of message at least includes an operation code (commonly referred to as an opcode for short) that has a fixed size and position within each different type of message. For example, as shown in FIGS. 2 and 3, the first four bits (e.g., the four least significant bits) in both the control message 200 and the execute message 300 corresponds to the opcode. Although the opcode field is shown in the illustrated examples as having a width of four bits, in other examples, the opcode field may correspond to a different size that is either greater than or less than four bits. The opcode serves to identify the particular type of message (e.g., whether it is a control message 200, an execute message 300, or some other type of message). Based on the opcode, the hardware device 104 is able to associate different bits in each message to the appropriate field according to a known structure of the message identified by the opcode. Thus, although the ordering of the fields in each message can be arbitrarily defined, the order of the fields is fixed before implementing the computing system 100 with both the logic circuitry 102 and the hardware device 104 having access to the preconfigured structure of the different messages that may be used. In this manner, the logic circuitry 102 is able to generate specific messages that can then be interpreted by the hardware device 104 based on the consistent structure defined for each type of message.

Complex messages with many different fields of different lengths and arranged in any suitable order (e.g., as arbitrarily dictated by a programmer) effectively correspond to a struct commonly used in C programming languages. As used herein, a "struct" is defined to be a composite data type that defined a grouped list of variables (e.g., comparable to the individual fields of a message) to be placed in a block of memory accessible via a single pointer and/or referenced by a single address. To generate a struct corresponding to either of the messages 200, 300 of FIGS. 2 and/or 3 in a form suitable to provide as a message to the hardware device 104 using native C code typically takes dozens, if not hundreds, of individual assembly instructions or operations. Examples disclosed herein enable the logic circuitry 102 to build or generate a message (e.g., the example messages 200, 300) in significantly fewer operations for much more efficient implementations. In some examples, the logic circuitry 102 generates the message one field at a time based on a single operation for each field. Thus, in some examples, the logic circuitry 102 generates a complete message in the same number of operations (e.g., same number of clock cycles) as the number of fields in the message. Further, in some examples, the logic circuitry 102 generates a message in fewer operations (e.g., fewer clock cycles) than the number of fields in the message by adding multiple fields in a single operation to build a complete message. Further detail regarding efficient generation of messages by the logic circuitry 102 is provided below in connection with FIGS. 4-6.

Figures 4, 5:
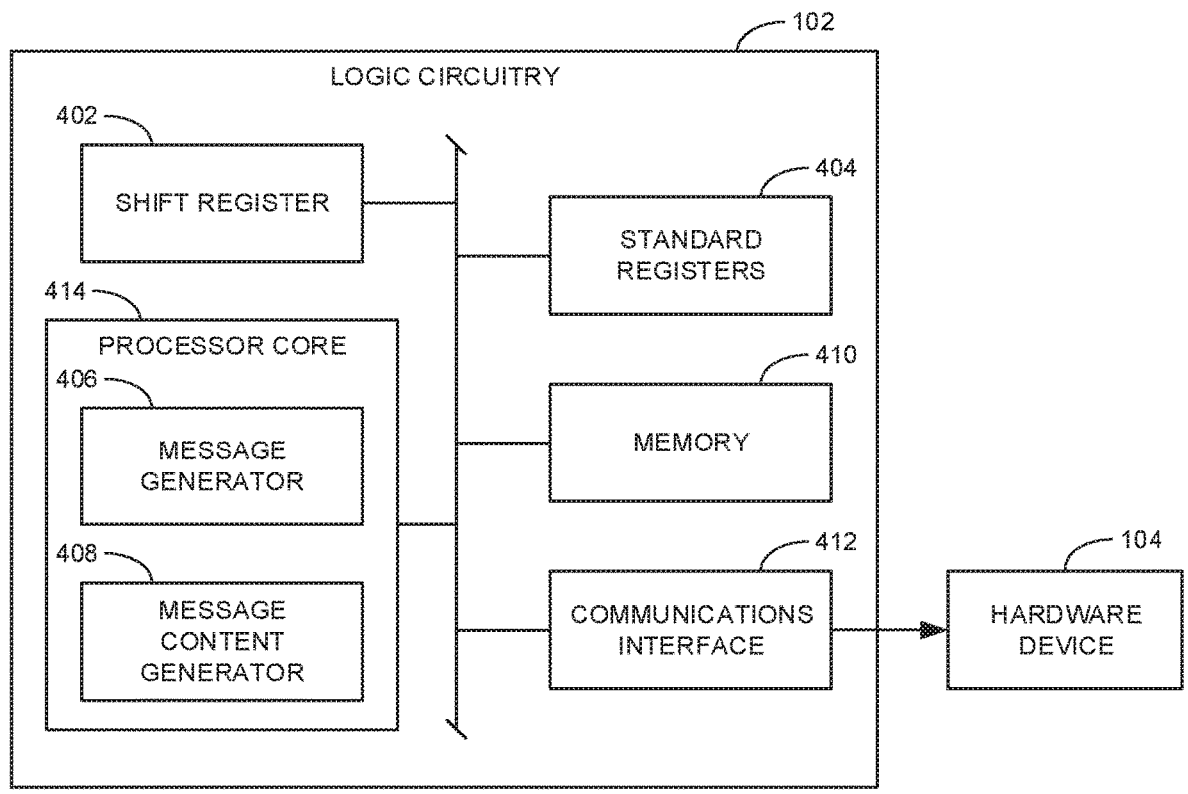
FIG. 4 is a block diagram of an example implementation of the example logic circuitry of FIG. 1.
FIG. 5 is an example sequence of instruction set architecture (ISA) operations implemented by the example logic circuitry of FIGS. 1 and/or 4 to generate the example control message of FIG. 2.

FIG. 4 is a block diagram of an example implementation of the example logic circuitry 102 of FIG. 1. As shown in the illustrated example, the logic circuitry 102 includes an example shift register 402, example standard registers 404, an example message generator 406, an example message content generator 408, example memory 410, and an example communications interface 412. The example message generator 406 and the example message content generator 408 may be implemented by dedicated circuitry and/or by a processor core 414 executing firmware or software as shown in FIG. 4.

The example shift register 402 combines values corresponding to the different fields of a particular message for the hardware device 104 as the message is being built by the logic circuitry before the completed message is sent to the hardware device 104. The shift register 402 is populated with the relevant data to build or generate a message by the example message generator 406. In some examples, the shift register 402 is constructed with a width (in number of bits) corresponding to the width of the example bus 106. Thus, where the bus 106 is a 96-bit message bus, the shift register 402 is capable of storing an array of 96 bits. In other examples, the shift register 402 may have a width that is greater or smaller than the width of the bus 106.

In some examples, the message generator 406 causes the content (e.g., bit values) stored in the shift register 402 to shift (e.g., from a least significant bit towards the most significant bit) to create vacant bits in the shift register 402. Some of the shifted bits (e.g., the values of the bits associated with the most significant bits in the shift register 402) are removed from the register and replaced by other bits shifted within the shift register 402. In some examples, the message generator 406 assigns new values to the vacant bits produced from shifting the content already stored within the shift register 402. More particularly, in some examples, the new values correspond to the values associated with particular fields in a message to be sent to the hardware device 104.

In some examples, the message generator 406 causes the content in the shift register 402 to shift by a particular number of bits corresponding to the width of a particular field of a message to be generated. As a result, the message generator 406 may assign values to the resulting vacant bits based on the data associated with the particular field of the message. By repeating this process for subsequent fields in the message, the full message can be built within the shift register 402 in a piecemeal fashion. That is, in some examples, the message generator 406 adds the data associated with a particular field to the shift register 402 and then shifts that data (along with all other content already in the shift register 402) over by a corresponding number of bits sufficient to make room to add the data associated with the next field in the message. This process is repeated until the data associated with all fields in the message have been added.

In some examples, the content of the shift register 402 shifts from the least significant bit to the most significant bit. Accordingly, in some examples, the order in which the different fields of a message are added to the shift register 402 begins with the field associated with the most significant bit for the message (e.g., the fields at the bottom of the tables in FIGS. 2 and 3) followed by each adjacent field one position closer to the least significant bit (e.g., at the top of the tables in FIGS. 2 and 3). Thus, where the opcode is associated with the least significant bits in a message as described above, the opcode is the last field added to the shift register 402. As a result, the opcode will be located at the least significant bit position within the shift register, which corresponds to the defined structure of the message as shown in FIGS. 2 and 3.

In some examples, the shifting of the content in the shift register 402 and the assigning of new values of the next field to the resulting vacant bits is accomplished in a single operation (e.g., a single clock cycle). In some examples, the shifting and assigning of data are based on specific instruction set architecture (ISA) operations. In some examples, the functionality of each ISA operation is built into the underlying hardware associated with logic circuitry 102 of the example computing system 100. As such, there is a tradeoff between the number of different ISA operations available to the logic circuitry 102 (which can increase the efficiency with which data can be processed) and the cost of manufacturing the logic circuitry 102 to be able to perform such ISA operations. For instance, different ISA operations may be available to the logic circuitry 102 to shift the content of the shift register 402 by corresponding different numbers of bits. For example, a first ISA operation may shift the content in the shift register 402 by 4 bits and a second ISA operation may shift the content in the shift register 402 by 8 bits. The 8-bit shifting operation could be accomplished by performing the 4-bit shifting operation twice. As such, the 8-bit shifting operation is unnecessary and, therefore, may be omitted as a particular operation of a particular computing system to reduce hardware manufacturing costs. However, if the application for which the particular computing system is to be used frequently involves shifting 8 bits at a time, the ISA may omit the 8-bit shifting operation but include the 4-bit shifting operation, which would improve hardware efficiency but at the expense of reducing the operating efficiency of the system because an 8-bit shift would require two operations rather than one operation. Accordingly, in some examples, the additional cost and/or complexity in developing hardware that includes both the 8-bit shifting operation and the 4-bit shifting operation may be outweighed by gains in operating efficiency to the corresponding computing system. On the other hand, the rarity at which a 7-bit shifting operation is anticipated to be needed may not justify the costs of including such an operation in a particular system.

In light of the tradeoff between manufacturing costs and processor efficiency, in some examples, the logic circuitry 102 is associated with a limited set of ISA operations that enable the shifting of bits in the shift register 402 and the assigning of new values to the resulting vacant bits, by a corresponding limited set of possible shift values. In other words, in some examples, the available operations to shift the content in the shift register 402 are limited to shifting the content by any one of a first set of numbers of bits while operations to shift the content by other numbers of bits not in the first set are unavailable. The operations that enable the shifting of the shift register and the corresponding assignment of new data to the vacant bits are referred to herein as push operations. More particularly, in some examples, the push operations for adding new data to in the shift register 402 are limited to shifting the existing content in the register 402 by powers of two bits (e.g., 1 bit, 2 bits, 4 bits, 8 bits, 16, bits, 32 bits, etc.). The operations shift the content in the shift register 402 by powers of two to match the widths of the fields of the messages to be generated by the message generator 406 that, as described above for some examples, are also limited to bit widths corresponding to powers of two. Further, in some examples, additional send operations may be implemented that cause the content of the shift register 402 to be transmitted to the hardware device 104 over the bus 106. More particularly, in some examples, the logic circuitry 102 is constructed to implement the following ISA operations:

| | |
|---|---|
| msg_push1 <reg> | msg_push1 <imm> |
| msg_push2 <reg> | msg_push2 <imm> |
| msg_push4 <reg> | msg_push4 <imm> |
| msg_push8 <reg> | msg_push8 <imm> |
| msg_push16 <reg> | msg_push16 <imm> |
| msg_push32 <reg> | msg_push32 <imm> |
| msg_push_send <reg> | msg_push_send <imm> |
| msg_send | | where "msg_pushX" is a push operation that shifts the content in the shift register 402 by X bits and assigns the resulting vacant bits in the register with the input value defined by the <reg> and <imm> placeholders. The <reg> placeholder corresponds to a standard scalar register (e.g., one of the standard registers 404) associated with the logic circuitry 102 and the <imm> placeholder corresponds to an immediate value. The "msg_send" operation is a send operation that causes the content of the shift register 402 to be transmitted to the hardware device 104 over the bus 106. Accordingly, in some examples, the send operation is implemented after a full message has been built or generated in the shift register 402 by adding ones of the fields of the message to the register 402 one after another using different ones of the push operations.

Performing the send operation after the completion of a message being built in the shift register 402 adds an additional operation to generate and provide a complete message to the hardware device 104. In some examples, to further improve efficiency, the logic circuitry 102 is constructed to implement a push/send operation (e.g., "msg_push_send") that (1) shifts the content in the shift register 402 by the number of bits corresponding to the width of the opcode (e.g., 4 bits in the illustrated examples of FIGS. 2 and 3), (2) assigns the input value identified for the operation to the resulting vacant bits, and (3) transmits the full content of the shift register 402 in a single operation (e.g., a single clock cycle). In implementation the input value identified for the push/send operation corresponds to the value for the opcode such that the push/send operation involves adding the opcode to the shift register and then transmitting the full content of the shift register 402 over the bus 106. Combining the addition of the opcode to the shift register 402 with the transmission of the final message (contained in the shift register 402) reduces the total number of operations by one for increased efficiency.

In some examples, one or more of the ISA operations listed above may be omitted for the logic circuitry 102. For instance, in some examples, the largest push operation may only go up to 16 bits (e.g., the msg_push32 operations are omitted). As another example, the push operations that take immediate values may be omitted such that all push operations must reference a particular standard register 404. Additionally or alternatively, in some examples, additional ISA operations to those listed above may be available to the logic circuitry 102. For example, additional push operations that shift the shift register 402 by 64 bits may be made available to the logic circuitry. Further, in some examples, one or more push operations may shift the shift register 402 by a number of bits that is not a power of two. Including push operations that are not based on a power of two may be beneficial when the structure of one or more particular messages includes one or more fields having a width that is also not a power of two. Further, in some examples, additional ISA operations unrelated to shifting the shift register 402 and/or transmitting the content of the shift register 402 may also be made available to the logic circuitry 102.

As mentioned above, the standard registers 404 shown in FIG. 4 are standard scalar registers (e.g., 32-bit registers) that may store values corresponding to different fields of a message to be built or generated by the example message generator 406. While the standard registers 404 may store 32-bit values, when a particular standard register 404 is identified in connection with a push operation associated with less than 32 bits, only the least significant bits in the standard register 404 corresponding to the number of bits shifted in the shift register 402 (as defined by the corresponding ISA push operation) will be assigned to the shift register 402. In some examples, the values stored in the standard registers 404 (which are used to define values in fields of particular messages) are defined and/or generated by the message content generator 408 based on any suitable operations performed by the message content generator 408 prior to the building and/or generation of the particular message to be sent to the hardware device 104.

In the illustrated example of FIG. 4, the example logic circuitry 102 includes the example memory 410 to store definitions of different types of messages to be generated by the message content generator 408. That is, in some examples, the memory 410 includes data defining the structure of the different types of messages including the size (bit width) and ordering of the fields associated with the message as well as the value of the opcode identifying the particular message. In some examples, the hardware device 104 has access to the same information so that messages received from the logic circuitry 102 can be interpreted and processed as intended. Additionally or alternatively, in some examples, the memory 410 stores instructions defining the sequence of operations to be implemented by the message generator 406 to generate and transmit a particular message to the hardware device 104.

An example sequence of operations 500 is shown in FIG. 5. More particularly, the example sequence of operations 500 of FIG. 5 represents the sequence of ISA operations implemented by the logic circuitry 102 to generate the example message 200 of FIG. 2. As shown in the illustrated example, the entire message 200 of ten different fields with a combined width of 51 bits is generated and transmitted to the hardware device 104 using only six operations 502, 504, 506, 508, 510, 512. This is significantly less than the dozens (or more) operations that would be required to generate the message as a C struct using standard C code.

Figure 6:
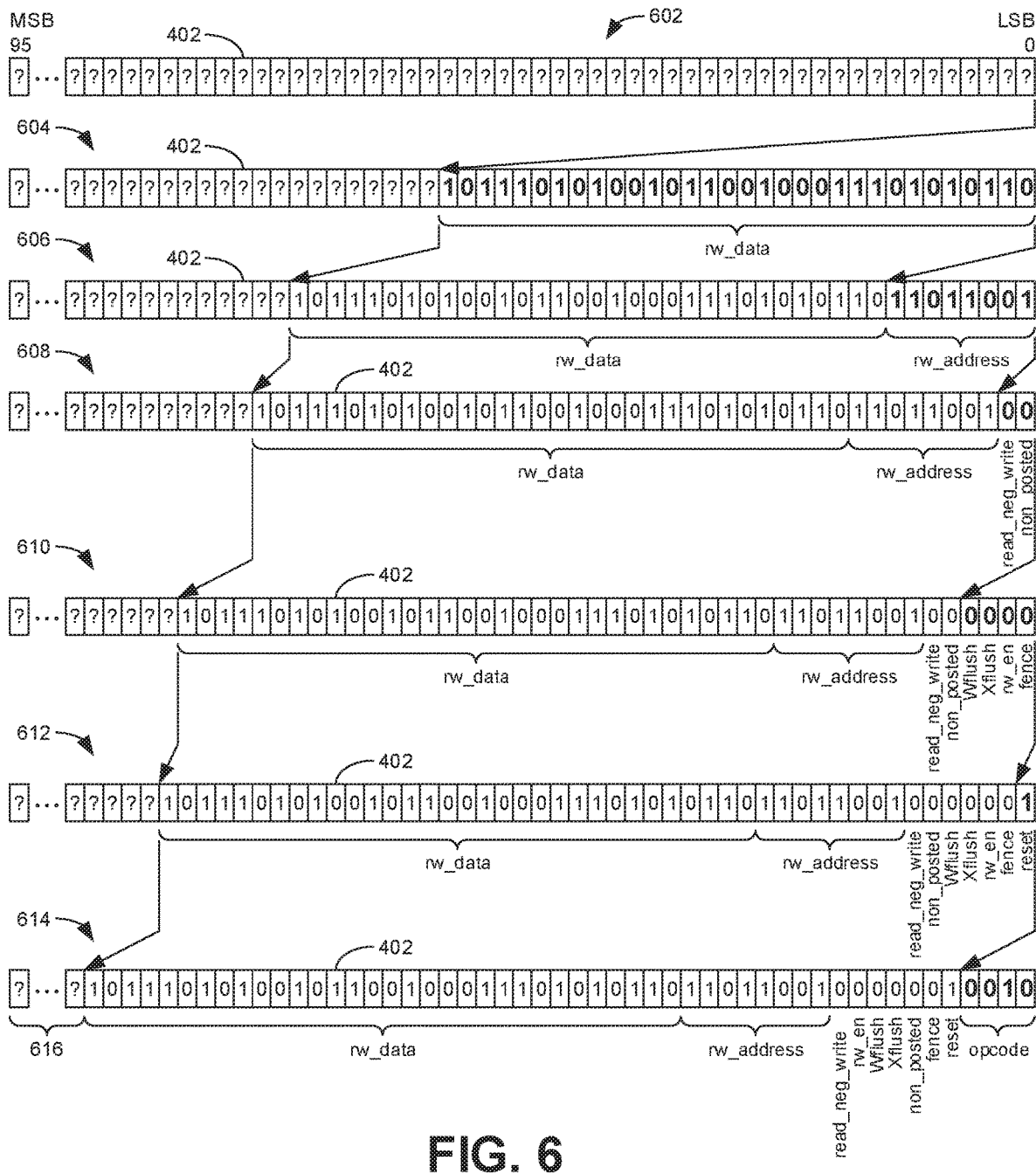
FIG. 6 illustrates updates to the example shift register of FIG. 4 in response to the example ISA operations of FIG. 5.

For purposes of explanation, the effects of the different operations in the sequence of operations 500 of FIG. 5 on the shift register 402 are illustrated in FIG. 6. More particularly, FIG. 6 illustrates updates to the example shift register 402 of FIG. 4 before and after each operation shown in FIG. 5. In the illustrated example, the shift register 402 is 96 bits wide (0 to 95) with the least significant bit shown on the right and the most significant bit shown on the left. At a first point in time 602, the shift register may contain any particular data that is not relevant to the message to be built by the message generator 406. In some examples, the content of the shift register 402 at the first point in time 602 corresponds to previously generated messages. However, as such data is not relevant to the new message to be generated, such data is represented by questions marks.

A second point in time 604 corresponds to the shift register 402 after the first operation 502 of FIG. 5 has been implemented. As shown in FIG. 5, the first operation 502 corresponds to the "msg_push32 r4" operation, which shifts the current content in the shift register 402 by 32 bits and assigns the resulting 32 vacant bits with the value stored in the standard register 404 associated with the label "r4." In this example, the "r4" standard register 404 contains the value for the 32-bit wide field labelled "rw_data" in FIG. 2. As shown in FIG. 2, the "rw_data" field corresponds to the most significant bit for the message 200 being built. This field is added to the shift register 402 first based on the direction in which the content of the shift register 402 is shifted (e.g., from the least significant bit toward the most significant bit). As a result, when all fields have been added to the register, the "rw_data" field will be in the most significant bit position with all other fields positioned according to the order of the message 200 shown in FIG. 2.

A third point in time 606 corresponds to the shift register 402 after the second operation 504 of FIG. 5 has been implemented. As shown in FIG. 5, the second operation 504 corresponds to the "msg_push8 r3" operation, which shifts the current content in the shift register 402 (including the value for the "rw_data" field) by 8 bits and assigns the resulting 8 vacant bits with the value stored in the standard register 404 associated with the label "r3." In this example, the "r3" standard register 404 contains the value for the 8-bit wide field labelled "rw_address" in FIG. 2.

As shown in FIG. 2, the next seven adjacent fields in the message 200 are all single-bit fields. For purposes of explanation, in this example, the value of the next six fields (e.g., from "read_neg_write" to "fence") have a value of zero, while the seventh single-bit field (e.g., "reset") has a value of one. In some examples, the message generator 406 may determine that the next six adjacent fields have the same value (e.g., zero) such that the multiple ones of the fields can be combined and assigned to the shift register 402 during a single clock cycle (e.g., a single operation). However, as mentioned above, in some examples, the number of bits by which the shift register 402 may be shifted is limited to the particular ISA operations available to the logic circuitry 102. In this example, the push operations are limited to shifting the shift register by powers of two. As such, it is not possible to shift the content of the shift register 402 (which at the third point in time 606 includes both the "rw_data" and "rw_address" fields) by six fields corresponds to the next six single-bit fields all having a value of zero. Accordingly, in some examples, the six fields are added to the shift register in two operations, including the third operation 506 that shifts the content by 2 bits and the fourth operation 508 that shifts the content by the 4 bits. While this is not as efficient as it could be if a 6-bit shifting operation were available, it is still more efficient than adding each field one at a time, which would take six operations. The result of the third operation 506 is represented at a fourth point in time 608 represented in FIG. 6 and the result of the fourth operation 508 is represented at a fifth point in time 610 represented in FIG. 6.

As shown in the illustrated example of FIG. 5, the third and fourth operations 506, 508 include an immediate value of 0 as the input (rather than an identified standard register 404 as in the first and second operations 502, 504). The immediate value of 0 is represented by a single bit. However, the number of bits shifted by both the third and fourth operations 506, 508 is greater than one. In some examples, when the input value for a push operation is represented by fewer bits than the number of vacant bits produced in the shift register 402 by the corresponding push operation, the input value is assigned to the least significant bits in the shift register and any extra vacant bits are assigned the value of zero. As a result, all of the vacant bits assigned by the third and fourth operations 506, 508 are zero. For the sake of comparison, if the fourth operation were "msg_push4 1," the four vacant bits would be assigned the values of 0-0-0-1 because the immediate input value of 1 is assigned to the least significant bit and the remaining three bits are assigned the value of 0.

While most significant bits are assigned 0 if not otherwise defined by the input value for the corresponding push operation, it is still possible for the message generator 406 to combine adjacent fields with a common value that is non-zero. For instance, assume four adjacent single bit fields all have the value of 1. In such a scenario, the single push operation of "msg_push4 15" would be able to add all four fields to the shift register 402 because the binary representation for the immediate value of 15 is 1-1-1-1. In some examples, the message generator 406 may combine adjacent fields with different values (e.g., including both 1s and 0s) into a single push operation in a similar manner by identifying the proper push notification that shifts the number of bits corresponding to the combined width of the adjacent fields and specifying the suitable input value to generate the bit values associated with the combined fields. In some examples, the input value may correspond to a standard register 404 that contains a concatenation of values for multiple adjacent fields in the message.

A sixth point in time 612 corresponds to the shift register 402 after the fifth operation 510 of FIG. 5 has been implemented. As shown in FIG. 5, the fifth operation 510 corresponds to the "msg_push1 1" operation, which shifts the current content in the shift register 402 (including the values corresponding to all fields from the "rw_data" field to the "fence" field) by 1 bit and assigns the resulting vacant bit with the immediate value of 1.

A seventh point in time 614 corresponds to the shift register 402 after the sixth operation 512 of FIG. 5 has been implemented. As shown in FIG. 5, the sixth operation 512 corresponds to the "msg_push_send 0x2" operation, which shifts the current content in the shift register 402 (including the values corresponding to all fields except the opcode) by 4 bits and assigns the resulting 4 vacant bits with the immediate value of 2 (e.g., "0x2" in hexadecimal notation). As explained above, because the value of 2 is represented using two bits (e.g., 1-0), the two most significant bits in the four vacant bits are assigned a value of 0.

As shown in FIG. 6, at the seventh point in time 614, the shift register 402 includes the values corresponding to all of the fields in the control message 200 of FIG. 2. Furthermore, the order of the fields is consistent with the structure of the control message 200 as defined in the table of FIG. 2. As a result, the content of the shift register 402 may be transmitted to the hardware device 104. In this example, the transmission is triggered by the sixth operation 512. That is, the opcode is added to the shift register 402 and the resulting contents are transmitted in a single clock cycle (e.g., in a single operation). In other examples, a standard push operation may add the opcode to the shift register 402 followed by a separate send message to initiate transmission of the content of the shift register. In some examples, the communications interface 412 of FIG. 4 transmits the content of the shift register 402 over the bus 106.

As described above, the total width of the control message 200 is 51 bits, which is less than the 96 bits associated with the shift register 402 in the illustrated example of FIG. 6. Accordingly, in some examples, when the content of the shift register 402 is transmitted to the hardware device 104, there will be excess data 616 included in the transmission that is not part of the message that the message generator 406 just built. Specifically, as shown in FIG. 6, the excess data 616 corresponds to the most significant bits in the shift register 402. In some examples, transmitting the excess data to the hardware device 104 is not disruptive to the processing of the intended message 200 because the opcode included at the beginning of the message (e.g., at the least significant bits in the shift register 402). As described above, the opcode identifies the type of message being sent, thereby enabling the hardware device 104 to determine the total width of the message, as well as the particular fields in the message and their associated size and order. As a result, the hardware device 104 may process the relevant data in the shift register 402 (corresponding to the generated message) and disregard the excess data 616. By enabling the hardware device 104 to easily identify relevant data and ignore the excess data 616 in this matter, it is possible to generate messages of different lengths (e.g., some relatively long (up to the width of the shift register 402) and others much shorter) and different structures (different sized fields in each message) directly after one another in the shift register 402 in rapid succession to provide instructions to the hardware device 104 in an efficient manner.

While an example manner of implementing the example logic circuitry 102 of FIG. 1 is illustrated in FIG. 4, one or more of the elements, processes and/or devices illustrated in FIG. 4 may be combined, divided, re-arranged, omitted, eliminated and/or implemented in any other way. In some examples, the logic circuitry 103 of FIG. 1 may be implemented by hardware and/or hardware in combination with software and/or firmware. For instance, the example shift register 402, the example standard registers 404, the example message generator 406, the example message content generator 408, the example memory 410, and/or the example communications interface 412 of the example logic circuitry 102 of FIG. 1 may be implemented by hardware, software, firmware and/or any combination of hardware, software and/or firmware. Thus, for example, any of the example shift register 402, the example standard registers 404, the example message generator 406, the example message content generator 408, the example memory 410, the example communications interface 412 and/or, more generally, the example logic circuitry 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example shift register 402, the example standard registers 404, the example message generator 406, the example message content generator 408, the example memory 410, and/or the example communications interface 412 is/are hereby expressly defined to include a non-transitory computer readable storage device or storage disk such as a memory, a digital versatile disk (DVD), a compact disk (CD), a Blu-ray disk, etc. including the software and/or firmware. Further still, the example logic circuitry 102 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
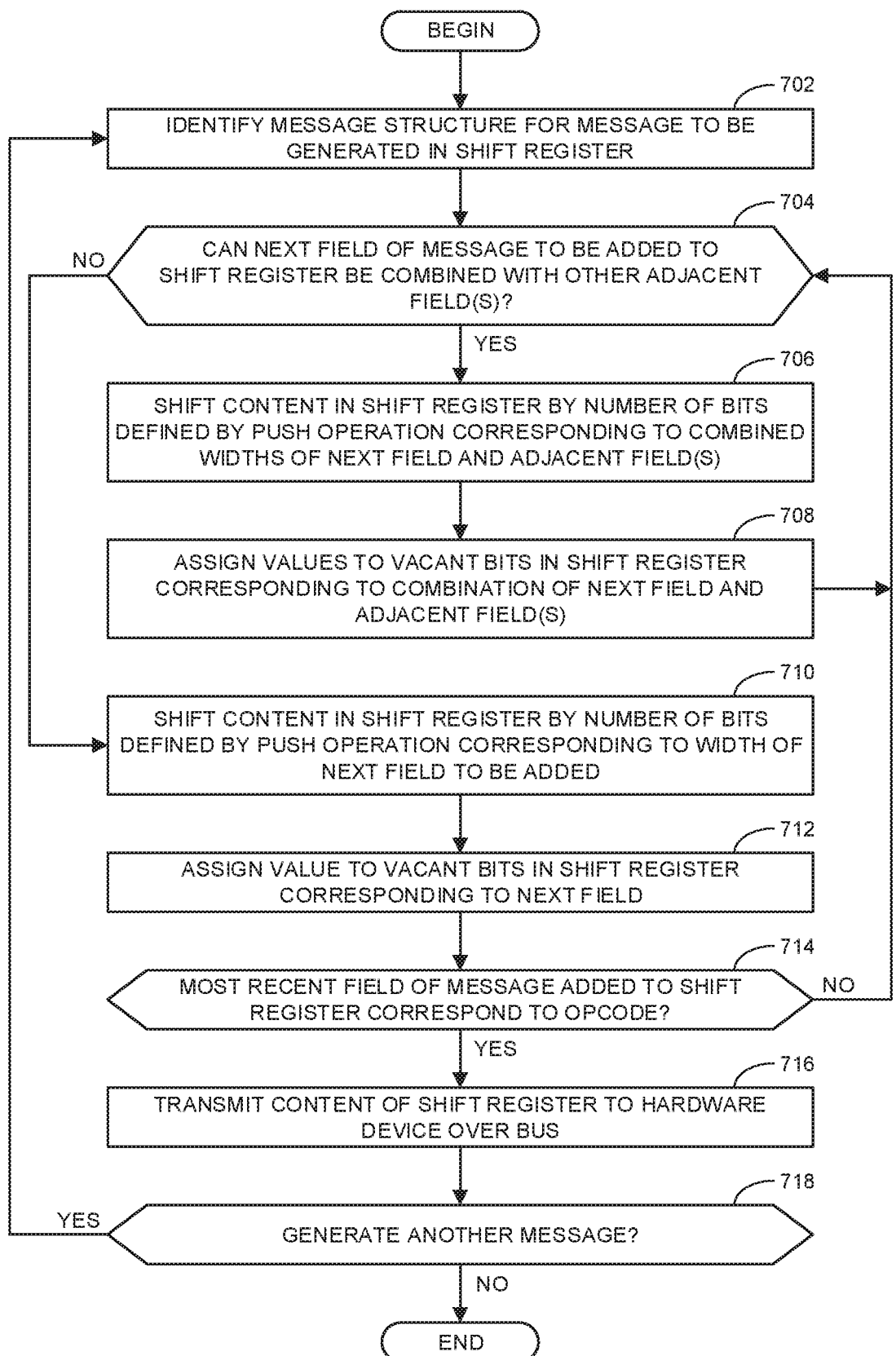
FIG. 7 is a flowchart representative of machine readable instructions which may be executed to implement the example logic circuitry of FIGS. 1 and/or 4.

A flowchart representative of example hardware logic, machine readable instructions, hardware implemented state machines, and/or any combination thereof for implementing the logic circuitry 102 of FIGS. 1 and/or 4 is shown in FIG. 7. The machine readable instructions may be one or more executable programs or portion(s) of an executable program for execution by a computer processor such as the processor 812 shown in the example processor platform 800 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example logic circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require the addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 7 begins at block 702 where the example message generator 406 identifies the message structure for a message to be generated in a shift register (e.g., the shift register 402). At block 704, the example message generator 406 determines whether the next field of the message to be added to the shift register 402 can be combined with other adjacent field(s). In some examples, the next field of the message to be added to the shift register corresponds to the field associated with the most significant bits in the message that has not yet been added to the shift register. That is, in some examples, the message is built in reverse beginning with the last field (e.g., the field associated with the most significant bit) and moving from one field to the next toward the least significant bit. If the example message generator 406 determines that the next field and the adjacent field(s) can be combined (block 704), control advances to block 706 where the example message generator 406 shifts the content in the shift register 402 by the number of bits defined by the push operation corresponding to the combined widths of the next field and the adjacent field(s). Thereafter, at block 708, the example message generator 406 assigns a value to vacant bits in the shift register 402 corresponding to the combination of the next field and the adjacent field(s). In some examples, the value assigned to the vacant bits is defined by an immediate value designated as an input for the push operation implemented by the message generator 406. In other examples, the value assigned to the vacant bits is defined by a value in a standard register (e.g., one of the standard registers 404) designated as an input for the push operation implemented by the message generator 406. Thereafter, control returns to block 704. In some example, blocks 706 and 708 are implemented in a single operation associated with a particular ISA push operation.

Returning to block 704, if the example message generator 406 determines that the adjacent fields are not to be combined, control advances to block 710 where the example message generator 406 shifts the content in the shift register 402 by the number of bits defined by the push operation corresponding to the width of the next field to be added. Thereafter, at block 712, the example message generator 406 assigns a value to vacant bits in the shift register 402 corresponding to the next field. In some examples, the value assigned to the vacant bits is defined by an immediate value designated as an input for the push operation implemented by the message generator 406. In other examples, the value assigned to the vacant bits is defined by a value in a standard register (e.g., one of the standard registers 404) designated as an input for the push operation implemented by the message generator 406. Thereafter, control advances to block 714. In some example, blocks 710 and 712 are implemented in a single operation associated with a particular ISA push operation.

At block 714, the example message generator 406 determines whether the most recent field of the message added to the shift register corresponds to the opcode. If not, control returns to block 704. If so, control advances to block 716 where the example communications interface 412 transmits the content of the shift register 402 to a hardware device (e.g., the hardware device 104) or a bus (e.g., the example bus 106). In some examples, the transmission of block 714 is implemented as part of the same operation of the addition of the opcode to the shift register 402 based on a push/send operation. In other examples, the transmission of block 714 is implemented in a separate operation after the opcode has been added to the shift register 402.

At block 718, the example message generator 406 determines whether to generate another message. If so, control returns to block 702. Otherwise, the example process of FIG. 7 ends.

FIG. 8 is a block diagram of an example processor platform 800 structured to execute the instructions of FIG. 7 to implement the logic circuitry 102 of FIGS. 1 and/or 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example shift register 402, the example standard registers 404, the example message generator 406, the example message content generator 408, the example memory 410, and the example communications interface 412. As shown in the illustrated example, the processor platform 800 includes the hardware device 104 of FIG. 1, which is in communication with the processor 812 via a bus 818. In some examples, the bus 818 corresponds to the bus 106 in the illustrated example of FIG. 1.

The processor 812 of the illustrated example includes a local memory 813 (e.g., a cache). In some examples, the local memory 813 is combined with and/or the same as the example memory 410 of FIG. 4. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

FIG. 9 is a block diagram of another example processor platform 900 structured to execute the instructions of FIG. 7 to implement the logic circuitry 102 of FIGS. 1 and/or 4. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In contrast with the example processor platform 800 of FIG. 8, the processor 912 of the example processor platform 900 of FIG. 9 is independent of but communicatively coupled to the logic circuitry 102 via a bus 918. In this example, as outlined above, separate logic circuitry 102 implements the example shift register 402, the example standard registers 404, the example message generator 406, the example message content generator 408, the example memory 410, and the example communications interface 412. As shown in the illustrated example, the processor platform 900 also includes the hardware device 104 of FIG. 1, which is in communication with the processor 912 and the logic circuitry 102 via the bus 918. In some examples, the bus 918 corresponds to the bus 106 in the illustrated example of FIG. 1.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, on a removable non-transitory computer readable storage medium such as a CD or DVD, and/or locally within the logic circuitry 102.

From the foregoing, it will be appreciated that example methods, apparatus and articles of manufacture have been disclosed that enable the efficient generation and transmission of complex messages containing multiple different fields of different bit widths. Past approaches would build such messages as a struct in a manner that would take dozens or even hundreds of operations. By contrast, examples disclosed herein are able to generate a message in as few operations (e.g., clock cycles) as there are fields in the message. In some examples, the transmission of the message may be combined with a final operation to generate the message, thereby including the generation and transmission of the message in the same number of operations as the number of fields in the message. Further, in some examples, the generation of a message may be achieved in fewer operations than the number of fields in the message by combining multiple fields together when building the message. Generating and then transmitting messages with such few operations significantly improves the efficiency of a computing device. Thus, the disclosed methods, apparatus and articles of manufacture are accordingly directed to one or more improvement(s) in the functioning of a computer.

Example methods, apparatus, systems, and articles of manufacture to implement efficient communications between components of computing systems are disclosed herein. Further examples and combinations thereof include the following:

Example 1 is an apparatus comprising a message generator to add a first value associated with a first field of a message to a shift register based on a first push operation, the message including multiple fields, at least two of the fields having different bit widths, and add a second value associated with a second field of the message to the shift register based on a second push operation, the second value to be adjacent the first value in the shift register in accordance with a structure of the message, and a communications interface to transmit content stored in the shift register to a hardware device via a bus having a width corresponding to a width of the shift register, the content including the message.

Example 2 includes the apparatus of example 1, wherein the first push operation is to define (i) a first number of bits by which the content in the shift register is to be shifted and (ii) at least one of the first value or a location of the first value, and to add the first value to the shift register, the message generator to shift the content in the shift register by the first number of bits defined by the first push operation, the first number of bits based on a first width of the first field, and assign the first value to vacant bits in shift register, the vacant bits resulting from the shift of the content in the shift register by the first number of bits.

Example 3 includes the apparatus of example 2, wherein the message generator is to shift the content in the shift register in a direction from a least significant bit in the shift register toward a most significant bit in the shift register.

Example 4 includes the apparatus of any one of examples 2 or 3, wherein the second push operation defines a second number of bits by which the content in the shift register is to be shifted, the second number different than the first number.

Example 5 includes the apparatus of any one of examples 1-4, wherein the first and second push operations correspond to different ones of a set of available push operations, respective ones of the push operations in the set of available push operations to define corresponding different numbers of bits by which the content in the shift register is to be shifted.

Example 6 includes the apparatus of example 5, wherein the different numbers of bits correspond to respective different powers of two.

Example 7 includes the apparatus of any one of examples 1-6, wherein the first push operation is an initial push operation implemented to generate the message, the first field of the message including a most significant bit of the message.

Example 8 includes the apparatus of any one of examples 1-7, wherein the message generator is to add a third value to the shift register based on a third push operation, the third push operation to shift the content in the shift register by a number of bits corresponding to a combined width of two or more of the fields of the message, the third value corresponding to values associated with respective ones of the two or more of the fields.

Example 9 includes the apparatus of any one of examples 1-8, wherein the message generator is to add values associated with all of the fields of the message to the shift register based on a series of push operations, the series of push operations including the first and second push operations.

Example 10 includes the apparatus of example 9, wherein the message generator is to add a last value to the shift register based on a last push operation in the series of push operations, the last value corresponding to an opcode for the message.

Example 11 includes the apparatus of any one of examples 9 or 10, wherein the message generator is to add all of the values associated with the message to the shift register in a number of clock cycles equal to or less than a number of the fields, respective ones of the push operations in the series of push operations implemented in corresponding ones of the clock cycles.

Example 12 includes the apparatus of example 11, wherein the communications interface is to transmit the content of the shift register to the hardware device in a same one of the clock cycles as when the message generator adds a last value to the shift register based on a last push operation in the series of push operations.

Example 13 includes the apparatus of any one of examples 1-12, wherein a total width of the message is less than the width of the shift register such that the content includes excess data unrelated to the message.

Example 14 includes the apparatus of example 13, wherein one of the fields of the message corresponds to an opcode for the message, the opcode to enable the hardware device to distinguish the message from the excess data.

Example 15 includes the apparatus of any one of examples 1-14, wherein the message is a first message, after the communications interface is to transmit, at a first point in time, the content including the first message the message generator is to add new values to the shift register, the new values associated with multiple fields of a second message, the second message having a different total width than the first message based on differences in at least one of a number of the fields in each of the first and second messages or the bit widths of the fields in each of the first and second messages, and the communications interface is to transmit, at a second point in time, the content of the shift register to the hardware device via the bus, the content transmitted at the second point in time including the second message.

Example 16 includes a non-transitory computer readable medium comprising instructions that, when executed, cause a machine to at least add a first value associated with a first field of a message to a shift register based on a first push operation, the message including multiple fields, at least two of the fields having different bit widths, add a second value associated with a second field of the message to the shift register based on a second push operation, the second value to be adjacent the first value in the shift register in accordance with a structure of the message, and transmit a content stored in the shift register to a hardware device via a bus having a width corresponding to a width of the shift register, the content including the message.

Example 17 includes the non-transitory computer readable medium of example 16, wherein the first push operation is to define (i) a first number of bits by which the content in the shift register is to be shifted and (ii) at least one of the first value or a location of the first value, and to add the first value to the shift register, the instructions to cause the machine to shift the content in the shift register by the first number of bits defined by the first push operation, the first number of bits based on a first width of the first field, and assign the first value to vacant bits in shift register, the vacant bits resulting from the shift of the content in the shift register by the first number of bits.

Example 18 includes the non-transitory computer readable medium of example 17, wherein the instructions cause the machine to shift the content in the shift register in a direction from a least significant bit in the shift register toward a most significant bit in the shift register.

Example 19 includes the non-transitory computer readable medium of any one of examples 17 or 18, wherein the second push operation defines a second number of bits by which the content in the shift register is to be shifted, the second number different than the first number.

Example 20 includes the non-transitory computer readable medium of any one of examples 16-19, wherein the first and second push operations correspond to different ones of a set of available push operations, respective ones of the push operations in the set of available push operations to define corresponding different numbers of bits by which the content in the shift register is to be shifted.

Example 21 includes the non-transitory computer readable medium of example 20, wherein the different numbers of bits corresponding to respective different powers of two.

Example 22 includes the non-transitory computer readable medium of any one of examples 16-21, wherein the first push operation is an initial push operation implemented to generate the message, the first field of the message including a most significant bit of the message.

Example 23 includes the non-transitory computer readable medium of any one of examples 16-22, wherein the instructions further cause the machine to add a third value to the shift register based on a third push operation, the third push operation to shift the content in the shift register by a number of bits corresponding to a combined width of two or more of the fields of the message, the third value corresponding to values associated with respective ones of the two or more of the fields.

Example 24 includes the non-transitory computer readable medium of any one of examples 16-23, wherein the instructions further cause the machine to add values associated with all of the fields of the message to the shift register based on a series of push operations, the series of push operations including the first and second push operations.

Example 25 includes the non-transitory computer readable medium of example 24, wherein the instructions further cause the machine to add a last value to the shift register based on a last push operation in the series of push operations, the last value corresponding to an opcode for the message.

Example 26 includes the non-transitory computer readable medium of any one of examples 24 or 25, wherein the instructions further cause the machine to add all of the values associated with the message to the shift register in a number of clock cycles equal to or less than a number of the fields, respective ones of the push operations in the series of push operations implemented in corresponding ones of the clock cycles.

Example 27 includes the non-transitory computer readable medium of example 26, wherein the instructions further cause the machine to transmit the content of the shift register to the hardware device in a same one of the clock cycles as when a last value of all the values associated with the message is added to the shift register.

Example 28 includes the non-transitory computer readable medium of any one of examples 16-27, wherein a total width of the message is less than the width of the shift register such that the content transmitted to the hardware device includes excess data unrelated to the message.

Example 29 includes the non-transitory computer readable medium of example 28, wherein one of the fields of the message corresponds to an opcode for the message, the opcode to enable the hardware device to distinguish the message from the excess data.

Example 30 includes the non-transitory computer readable medium of any one of examples 16-29, wherein the message is a first message and the instructions further cause the machine to, after transmitting, at a first point in time, the content including the first message add new values to the shift register, the new values associated with multiple fields of a second message, the second message having a different total width than the first message based on differences in at least one of a number of the fields in each of the first and second messages or the bit widths of the fields in each of the first and second messages, and transmit, at a second point in time, the content of the shift register to the hardware device via the bus, the content transmitted at the second point in time including the second message.

Example 31 includes a method comprising adding a first value associated with a first field of a message to a shift register based on a first push operation, the message including multiple fields, at least two of the fields having different bit widths, adding a second value associated with a second field of the message to the shift register based on a second push operation, the second value to be adjacent the first value in the shift register in accordance with a structure of the message, and transmitting content stored in the shift register to a hardware device via a bus having a width corresponding to a width of the shift register, the content including the message.

Example 32 includes the method of example 31, wherein the first push operation is to define (i) a first number of bits by which the content in the shift register is to be shifted and (ii) at least one of the first value or a location of the first value, and to add the first value to the shift register, the method further including shifting the content in the shift register by the first number of bits defined by the first push operation, the first number of bits based on a first width of the first field, and assigning the first value to vacant bits in shift register, the vacant bits resulting from the shift of the content in the shift register by the first number of bits.

Example 33 includes the method of example 32, further including shifting the content in the shift register in a direction from a least significant bit in the shift register toward a most significant bit in the shift register.

Example 34 includes the method of any one of examples 32 or 33, wherein the second push operation defines a second number of bits by which the content in the shift register is to be shifted, the second number different than the first number.

Example 35 includes the method of any one of examples 31-34, wherein the first and second push operations correspond to different ones of a set of available push operations, respective ones of the push operations in the set of available push operations to define corresponding different numbers of bits by which the content in the shift register is to be shifted.

Example 36 includes the method of example 35, wherein the different numbers of bits correspond to different powers of two.

Example 37 includes the method of any one of examples 31-36, wherein the first push operation is an initial push operation implemented to generate the message, the first field of the message including a most significant bit of the message.

Example 38 includes the method of any one of examples 31-37, further including adding a third value to the shift register based on a third push operation, the third push operation to shift the content in the shift register by a number of bits corresponding to a combined width of two or more of the fields of the message, the third value corresponding to values associated with respective ones of the two or more of the fields.

Example 39 includes the method of any one of examples 31-38, further including adding values associated with all of the fields of the message to the shift register based on a series of push operations, the series of push operations including the first and second push operations.

Example 40 includes the method of example 39, further including adding a last value to the shift register based on a last push operation in the series of push operations, the last value corresponding to an opcode for the message.

Example 41 includes the method of any one of examples 39 or 40, further including adding of all of the values associated with the message to the shift register in a number of clock cycles equal to or less than a number of the fields, respective ones of the push operations in the series of push operations implemented in corresponding ones of the clock cycles.

Example 42 includes the method of example 41, further including transmitting the content of the shift register to the hardware device in a same one of the clock cycles as when a last value is added to the shift register based on a last push operation in the series of push operations.

Example 43 includes the method of any one of examples 31-42, wherein a total width of the message is less than the width of the shift register such that the content includes excess data unrelated to the message.

Example 44 includes the method of example 43, wherein one of the fields of the message corresponds to an opcode for the message, the opcode to enable the hardware device to distinguish the message from the excess data.

Example 45 includes the method of any one of examples 31-44, wherein the message is a first message and further including, after transmitting, at a first point in time, the content including the first message adding new values to the shift register, the new values associated with multiple fields of a second message, the second message having a different total width than the first message based on differences in at least one of a number of the fields in each of the first and second messages or the bit widths of the fields in each of the first and second messages, and transmitting, at a second point in time, the content of the shift register to the hardware device via the bus, the content transmitted at the second point in time including the second message.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a message generator to:
shift, based on a first push operation, bit values in a shift register to create first vacant bits in the shift register;
assign, based on the first push operation, a first value associated with a first field of a message to the first vacant bits in the shift register;
shift, based on a second push operation, the bit values in the shift register to create second vacant bits in the shift register; and
assign, based on the second push operation, a second value associated with a second field of the message to the second vacant bits in the shift register, the second value to be adjacent the first value in the shift register in accordance with a structure of the message; and
a communications interface to transmit content stored in the shift register to a hardware device via a bus having a width corresponding to a width of the shift register, the content including the message.

2. The apparatus of claim 1, wherein the first push operation is to define (i) a first number of bits corresponding to the first vacant bits and (ii) at least one of the first value or a location of the first value, the first number of bits based on a first width of the first field.

3. The apparatus of claim 2, wherein the message generator is to shift the bit values in the shift register in a direction from a least significant bit in the shift register toward a most significant bit in the shift register.

4. The apparatus of claim 2, wherein the second push operation is to define a second number of bits corresponding to the second vacant bits, the second number different than the first number.

5. The apparatus of claim 1, wherein the first push operation and the second push operation correspond to different ones of a set of available push operations, respective ones of the push operations in the set of available push operations to define corresponding different numbers of bits by which the bit values in the shift register are to be shifted.

6. The apparatus of claim 5, wherein the different numbers of bits correspond to respective different powers of two.

7. The apparatus of claim 1, wherein the first push operation is an initial push operation implemented to generate the message, the first field of the message including a most significant bit of the message.

8. The apparatus of claim 1, wherein the message generator is to:
shift, based on a third push operation, the bit values in the shift register to create third vacant bits in the shift register, the third vacant bits including a number of bits corresponding to a combined width of two or more fields of the message; and
assign, based on the third push operation, a third value to the third vacant bits in the shift register, the third value corresponding to values associated with respective ones of the two or more fields.

9. The apparatus of claim 1, wherein the message generator is to assign values associated with all fields of the message to the shift register based on a series of push operations, the series of push operations including the first push operation and the second push operation.

10. The apparatus of claim 9, wherein the message generator is to assign a last value to the shift register based on a last push operation in the series of push operations, the last value corresponding to an opcode for the message.

11. The apparatus of claim 9, wherein the message generator is to assign all of the values associated with the message to the shift register in a number of clock cycles equal to or less than a number of all the fields of the message, respective ones of the push operations in the series of push operations implemented in corresponding ones of the clock cycles.

12. The apparatus of claim 11, wherein the communications interface is to transmit the content of the shift register to the hardware device in a same one of the clock cycles as when the message generator assigns a last value to the shift register based on a last push operation in the series of push operations.

13. The apparatus of claim 1, wherein a total width of the message is less than the width of the shift register such that the content includes excess data unrelated to the message.

14. The apparatus of claim 13, wherein a field of the message corresponds to an opcode for the message, the opcode to enable the hardware device to distinguish the message from the excess data.

15. The apparatus of claim 1, wherein the message is a first message, the communications interface is to transmit the content at a first point in time, and the content stored in the shift register is to include the first message at the first point in time, after the first point in time:
the message generator is to assign new values to the shift register, the new values associated with multiple fields of a second message, the second message having a different total width than the first message based on differences in at least one of a number of fields in each of the first and second messages or bit widths of the fields in each of the first and second messages; and
the communications interface is to transmit, at a second point in time, the content of the shift register to the hardware device via the bus, the content transmitted at the second point in time including the second message.

16. A non-transitory computer readable medium comprising instructions that, when executed, cause a machine to at least:
shift, based on a first push operation, bit values in a shift register to create first vacant bits in the shift register;
assign, based on the first push operation, a first value associated with a first field of a message to the first vacant bits in the shift register;
shift, based on a second push operation, the bit values in the shift register to create second vacant bits in the shift register;
assign, based on the second push operation, a second value associated with a second field of the message to the second vacant bits in the shift register, the second value to be adjacent the first value in the shift register in accordance with a structure of the message; and
transmit content stored in the shift register to a hardware device via a bus having a width corresponding to a width of the shift register, the content including the message.

17. The non-transitory computer readable medium of claim 16, wherein the first push operation is to define (i) a first number of bits corresponding to the first vacant bits and (ii) at least one of the first value or a location of the first value, the first number of bits based on a first width of the first field.

18. The non-transitory computer readable medium of claim 17, wherein the second push operation is to define a second number of bits corresponding to the second vacant bits, the second number different than the first number.

19. The non-transitory computer readable medium of claim 16, wherein the instructions further cause the machine to assign values associated with all fields of the message to the shift register based on a series of push operations, the series of push operations including the first push operation and second push operation.

20. The non-transitory computer readable medium of claim 19, wherein the instructions further cause the machine to assign all of the values associated with the message to the shift register in a number of clock cycles equal to or less than a number of all the fields of the message, respective ones of the push operations in the series of push operations implemented in corresponding ones of the clock cycles.

21. A method comprising:
shifting, based on a first push operation, bit values in a shift register to create first vacant bits in the shift register;
assigning, based on the first push operation a first value associated with a first field of a message to the first vacant bits in the shift register;
shifting, based on a second push operation, the bit values in the shift register to create second vacant bits in the shift register;
assigning, based on the second push operation, a second value associated with a second field of the message to the second vacant bits in the shift register, the second value to be adjacent the first value in the shift register in accordance with a structure of the message; and
transmitting content stored in the shift register to a hardware device via a bus having a width corresponding to a width of the shift register, the content including the message.

22. The method of claim 21, wherein the first push operation is to define (i) a first number of bits corresponding to the first vacant bits and (ii) at least one of the first value or a location of the first value, the first number of bits based on a first width of the first field.

23. The method of claim 21, further including assigning values associated with all fields of the message to the shift register based on a series of push operations, the series of push operations including the first push operation and the second push operation.

24. The method of claim 23, wherein the assigning of all of the values associated with the message to the shift register is completed in a number of clock cycles equal to or less than a number of all the fields of the message, respective ones of the push operations in the series of push operations implemented in corresponding ones of the clock cycles.

* * * * *